United States Patent  (10) Patent No.: US 8,662,282 B1
Withington et al.  (45) Date of Patent: Mar. 4, 2014

(54) PALLET CONVEYOR DEBRIS WIPER

(71) Applicant: Ford Motor Company, Dearborn, MI (US)

(72) Inventors: Allen Withington, Strongsville, OH (US); David Aaron Arlequeeuw, Stow, OH (US); Daniel Marion, Parma, OH (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 13/670,497

(22) Filed: Nov. 7, 2012

(51) Int. Cl.
*B65G 45/10* (2006.01)

(52) U.S. Cl.
USPC ............. 198/494; 198/346.1; 198/463.3

(58) Field of Classification Search
USPC ............. 198/346.1, 463.6, 465.1, 493, 494
See application file for complete search history.

(56) References Cited

U.S. PATENT DOCUMENTS

| 3,631,968 | A | | 1/1972 | Ward |
| 4,787,500 | A | | 11/1988 | Holz |
| 4,913,279 | A | | 4/1990 | Tonissen |
| 4,917,231 | A | | 4/1990 | Swinderman |
| 4,944,386 | A | * | 7/1990 | Swinderman ............ 198/499 |
| 5,370,212 | A | * | 12/1994 | Mizutani et al. ........ 198/346.1 |
| 5,398,802 | A | * | 3/1995 | Clopton ............ 198/465.1 |
| 5,875,881 | A | * | 3/1999 | Brink ............ 198/499 |
| 6,170,630 | B1 | * | 1/2001 | Goss et al. ............ 193/35 A |
| 7,275,634 | B1 | | 10/2007 | Hinson |
| 7,383,941 | B2 | * | 6/2008 | St. John ............ 198/636 |
| 7,628,264 | B2 | * | 12/2009 | Ehlert ............ 198/341.01 |
| 7,866,457 | B2 | | 1/2011 | Swinderman et al. |
| 8,371,434 | B2 | * | 2/2013 | Mulder ............ 198/728 |
| 2002/0060127 | A1 | * | 5/2002 | Okuyama ............ 198/346.1 |
| 2003/0234161 | A1 | * | 12/2003 | Zoller et al. ............ 198/781.01 |
| 2009/0250346 | A1 | * | 10/2009 | Weschke et al. ............ 204/471 |
| 2011/0017569 | A1 | * | 1/2011 | Mulder ............ 198/300 |
| 2011/0240443 | A1 | * | 10/2011 | Ecob ............ 198/793 |

FOREIGN PATENT DOCUMENTS

JP 200085938 A 3/2000
JP 2000085938 A 3/2000

OTHER PUBLICATIONS

Direct Industry, The Virtual Industrial Exhibition, Metso Expect Results, Metso's Mining and Construction Technology.

* cited by examiner

*Primary Examiner* — Leslie A Nicholson, III
*Assistant Examiner* — Keith R Campbell
(74) *Attorney, Agent, or Firm* — Damian Porcari; Brooks Kushman P.C.

(57) ABSTRACT

A pallet transferred by a pallet conveyor on a flat top conveyor belt is disclosed that includes a wiper blade for clearing debris from the conveyor belt. The pallet includes a pallet frame having a plurality of corner locations. The wiper blades are disposed at the corner locations to clear articles of debris from the conveyor belt as the conveyor belt moves relative to the pallet in a transfer direction.

16 Claims, 2 Drawing Sheets

PALLET CONVEYOR DEBRIS WIPER

TECHNICAL FIELD

This disclosure relates to pallets for conveyors that include flat top belts that transfer the pallets between work stations.

BACKGROUND

Pallet conveyors are used to move heavy objects such as engine blocks, engine heads, transmissions, and the like through assembly line and other manufacturing processes. Pallet conveyors of the flat-top plastic chain link type may accidentally pick-up stray bolts, valve keys, retainers and other similar debris that may be carried to the drive end of the conveyor.

Bolts or other debris may become lodged between the chain and the wrap-around shoe and may break or separate the plastic chain links of the conveyor belt. The damage to the conveyor belt may well continue until the problem is discovered and the line is stopped by an emergency stop switch.

Any resulting damage to the conveyor must be repaired and may result in hours of downtime. If the damage is extensive, the entire conveyor belt may need to be repaired or replaced at considerable expense.

Chain clips comprising spring loaded wiper details that are attached to the conveyor have been proposed that are intended to prevent debris or other small parts from falling between the rollers and damaging the chain. Chain clips operate well in open areas but are ineffective to remove debris lodged against the back of the standard pallet details.

This disclosure is directed to solving the above problems and other problems as summarized below.

SUMMARY

A diagonally oriented wiper is proposed to be added to the bottom corner of a plurality of pallets to sweep bolts and debris off of the conveyor before the debris can travel to the end of the conveyor and cause damage to the conveyor. The diagonally oriented wipers sweep debris off of the conveyor belt and onto the floor.

According to one aspect of this disclosure, a pallet for a pallet conveyor having a flat top conveyor belt that transfers pallets. The pallets include a pallet frame having a plurality of corner locations on the pallet frame. Some of the corner locations have an angularly oriented wiper blade provided on a lower portion of the pallet frame for clearing an article of debris from the conveyor belt.

According to other aspects of this disclosure, the frame may have two leading corners and two trailing corners with one wiper being disposed on each of the two trailing corner locations. The conveyor chain transfers the pallets in a transfer direction and the wiper blades are oriented to move an article of debris in a lateral direction that is transverse to the transfer direction. The wiper blades may be diagonally oriented at the corner locations on a corner block of the pallet frame. The corner blocks each may define a clearance area on at least one side of the wiper blade between the pallet frame and the conveyor belt. The wiper blades function to clear an article of debris from the conveyor belt by pushing the article of debris inwardly as the conveyor belt moves relative to the pallet in the transfer direction.

According to another aspect of this disclosure, a pallet is disclosed for a conveyor having a conveyor belt that transfers a plurality of the pallets between a plurality of work stations. The pallet includes a pallet body for that supporting an article of manufacture that has a lower surface that is engaged by the conveyor belt to transfer the pallet in a transfer direction. A wiper may be assembled to the pallet to remove a piece of debris from the conveyor belt beneath the pallet in a direction transverse to the transfer direction.

According to other aspects of the disclosure, the pallet body may have two leading corners and two trailing corners with one wiper being disposed on each of the two trailing corners. The wipers may be diagonally oriented to move an article of debris in a lateral direction. The pallet body may define a clearance area on at least one side of the wiper blade beneath the pallet body and the conveyor belt. The wiper blades are used to remove pieces of debris from the conveyor belt by deflecting the piece of debris inwardly as the conveyor chain moves relative to the pallet body in the transfer direction.

According to a further aspect of this disclosure, a pallet conveyor system is disclosed that comprises a conveyor and an endless loop conveyor belt that is moved by the conveyor. A plurality of pallets are moved by the conveyor belt in a transfer direction along a rail of the conveyor. A wiper disposed on a lower surface of the pallets deflects an article of debris off of the conveyor belt as the conveyor belt moves relative to the pallets.

According to other aspects of the conveyor system, the pallets may have two leading corners and two trailing corners with one wiper being disposed on each of the two trailing corners. The wipers may be diagonally oriented to deflect the article of debris in a lateral direction that is transverse to the transfer direction. The pallet may define a clearance area on at least one side of the wiper blade beneath the pallet. The wiper is used to clear the article of debris from the conveyor belt by deflecting the article of debris inwardly as the conveyor belt moves relative to the pallet in the transfer direction.

The above aspects and other aspects of the illustrated embodiments of this disclosure will be described below with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
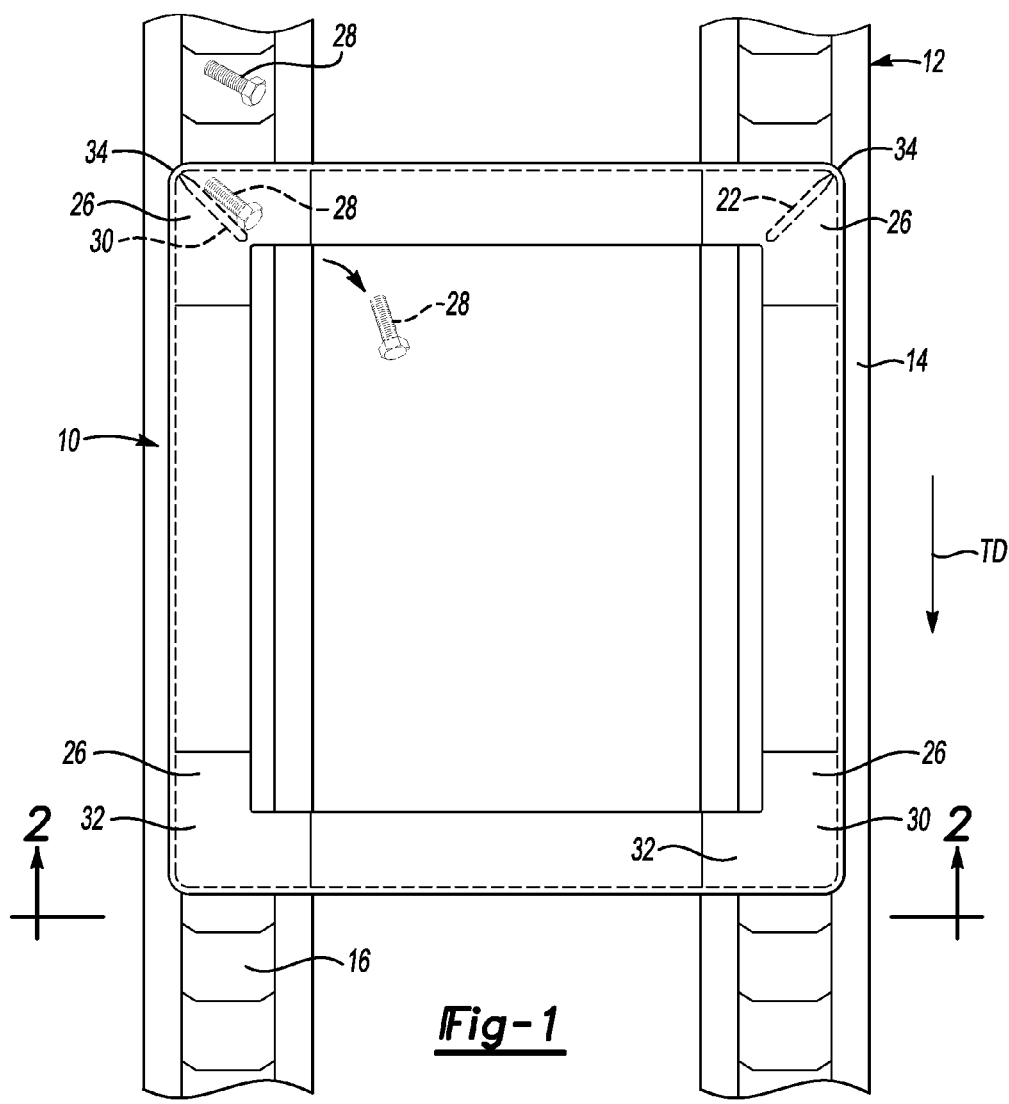
FIG. 1 is a fragmentary top plan view of a pallet on a conveyor that includes a flat top chain conveyor belt.
Figure 2:
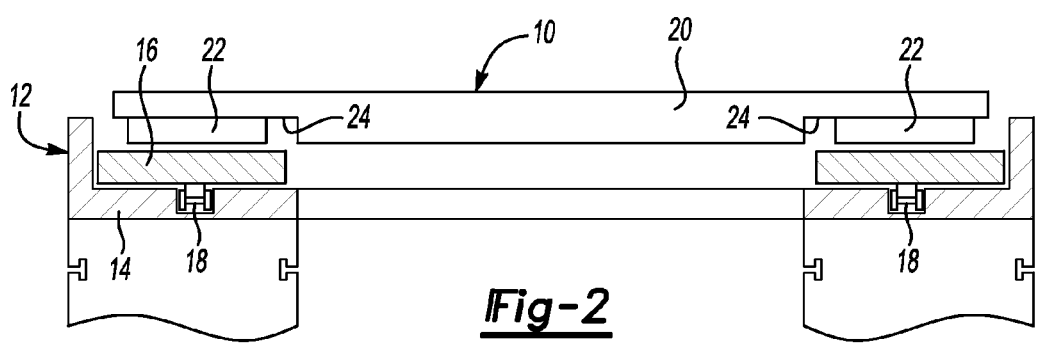
FIG. 2 is a fragmentary cross-sectional view taken along the line 2-2 in FIG. 1.

Referring to FIGS. 1 and 2, a pallet generally indicated by reference numeral 10 is illustrated in conjunction with a pallet conveyor generally indicated by reference numeral 12. The pallet conveyor 12 transfers the pallet 10 in a transfer direction indicated by the arrow TD in FIG. 1. The pallet conveyor 12 includes a pair of supporting rails 14 that support a flat top conveyor belt 16. Referring specifically to FIG. 2, the conveyor belt 16 is moved by a chain 18.

The pallet 10 includes a pallet body 20, or frame, that is used to support a work piece (not shown) as it is moved to an assembly operation. A wiper blade 22 is provided on a lower surface 24 of the pallet body 20.

Referring to FIG. 1, two wiper blades 22 are provided at two corner locations 26 for removing debris, such as bolts, valve keys, retainers, or other items from the conveyor belt 16. With continued reference to FIG. 1, the corner locations 26 may be formed as corner blocks 30 that are assembled to or provided by the pallet body 20. Leading corners 32 are provided on the front part of the pallet body 20. Trailing corners 34 are provided on the rear portion of the pallet body 20.

Figure 3:
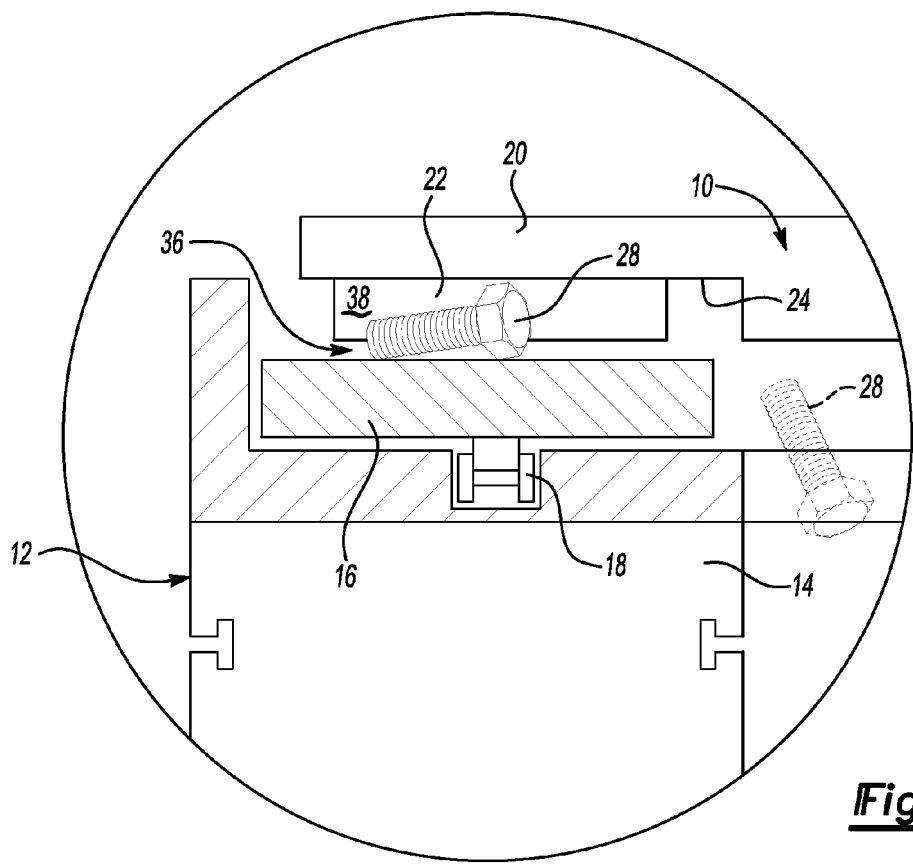
FIG. 3 is a fragmentary cross-sectional detail view of the pallet corner block showing the wiper blade clearing bolts from the conveyor belt.

Referring to FIG. 3, a close-up view is provided of the pallet 10 and pallet conveyor 12 in the area of the wiper 22. The conveyor belt 16 moves relative to the supporting rails 14. The conveyor belt 16 carries the pallet 10 to different workstation positions spaced along the pallet conveyor 12. The pallet 10 is lifted at each workstation to perform assembly operations on work pieces carried by the pallet 10.

If an article of debris 28, such as a bolt washer or other part, falls onto the conveyor belt 16, the conveyor belt 16 carries the debris until the debris 28 contacts the wiper blade 22. In FIG. 3, one bolt 28 is shown on the conveyor belt 16 and another bolt 28 is shown in phantom after being wiped or removed from the surface of the conveyor belt 16. The bolt 28 is moved laterally or transverse to the transfer direction in the illustrated embodiment until it falls between the supporting rails 14 of the pallet conveyor 12. The belt 16 is moved by a chain 18 that is disposed below the belt 16. A clearance area 36 is provided on one side 38 of the wiper blade 22. The clearance area 36 prevents the debris 28 from contacting the pallet body 20 and allows the wiper blade 22 to clear the debris 28 from the conveyor belt 16.

Figure 4:
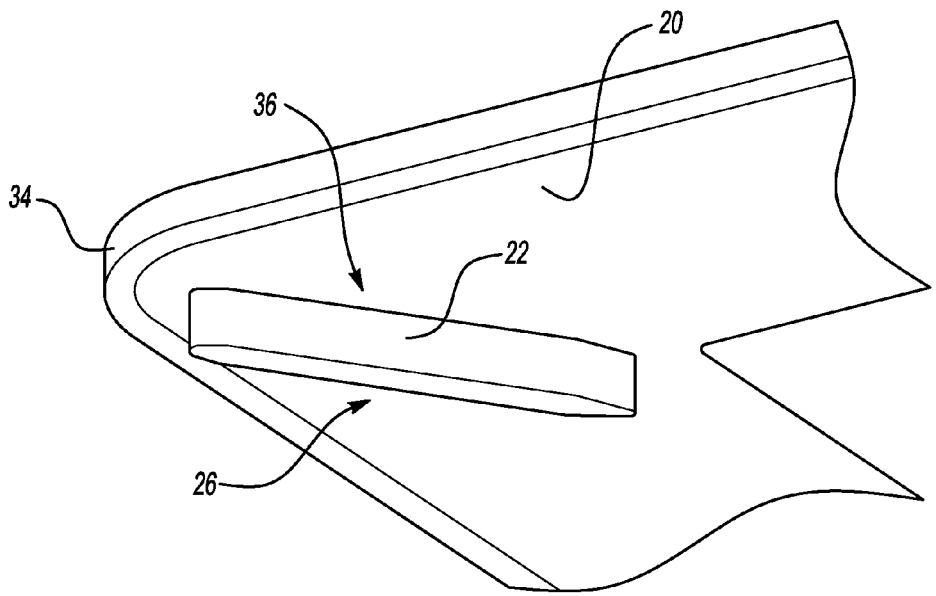
FIG. 4 is a fragmentary perspective view of a wiper blade on a corner block of a pallet.

Referring to FIG. 4, a corner location 26 and more particularly a trailing corner 34 of a pallet body 20 is illustrated. The wiper blade 22 is provided on the lower side of the pallet body 20. The wiper blade 22 partially defines the clearance area 36 below the pallet body 20.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A pallet for a pallet conveyor having a flat top conveyor belt that transfers the pallet, the pallet comprising:
    a pallet frame;
    a plurality of corner locations on the pallet frame; and
    an angularly oriented wiper blade provided on a lower portion of at least one of the corner locations for clearing an article of debris from the conveyor belt.

2. The pallet of claim 1 wherein the frame has two leading corner locations and two trailing corner locations with one of the wiper blades being disposed on each of the two leading corner locations.

3. The pallet of claim 1 wherein the conveyor belt transfers the pallet in a transfer direction and the wiper blades are oriented to move an article of debris in a lateral direction that is transverse to the transfer direction.

4. The pallet of claim 3 wherein each of the wiper blades are diagonally oriented at the corner location on a corner block of the pallet frame.

5. The pallet of claim 1 wherein the corner locations each define a clearance area on at least one side of the wiper blade between the pallet frame and a supporting rail.

6. The pallet of claim 1 wherein a plurality of the wiper blades are provided to clear an article of debris from the conveyor belt by pushing the article of debris inwardly as the conveyor belt moves relative to the pallet in a transfer direction.

7. A pallet for a conveyor having a conveyor belt that transfers a plurality of the pallets between a plurality of work stations, the pallet comprising:
    a pallet body that supports an article of manufacture, the pallet body having a lower surface that is engaged by the conveyor belt to transfer the pallet in a transfer direction; and
    a wiper assembled to the pallet to remove a piece of debris from the conveyor belt beneath the pallet in a transverse direction relative to the transfer direction.

8. The pallet of claim 7 wherein the pallet body has two leading corners and two trailing corners with one wiper being disposed on each of the two trailing corners.

9. The pallet of claim 7 wherein the wiper is diagonally oriented to move the piece of debris in a lateral direction.

10. The pallet of claim 7 wherein the pallet body defines a clearance area on at least one side of the wiper beneath the pallet body and the conveyor belt.

11. The pallet of claim 7 wherein the wiper removes the piece of debris from the conveyor belt by deflecting the piece of debris inwardly as the conveyor belt moves relative to the pallet body in the transfer direction.

12. A pallet conveyor system comprising:
    a conveyor;
    an endless loop conveyor belt that is moved by the conveyor;
    a plurality of pallets that are moved by the conveyor belt in a transfer direction along a rail of the conveyor; and
    a wiper disposed on a lower surface of the pallets that deflects an article of debris off of the conveyor belt as the conveyor belt moves relative to the pallets.

13. The pallet conveyor system of claim 12 wherein the pallets have two leading corners and two trailing corners with one wiper being disposed on each of the two trailing corners.

14. The pallet of claim 12 wherein the wiper is diagonally oriented to deflect the article of debris in a lateral direction that is transverse to the transfer direction.

15. The pallet of claim 12 wherein the pallet defines a clearance area on at least one side of the wiper beneath the pallet.

16. The pallet of claim 12 wherein the wiper clears the article of debris from the conveyor belt by deflecting the article of debris inwardly as the conveyor belt moves relative to the pallet in the transfer direction.

* * * * *